US011810241B2

United States Patent
Hulm (10) Patent No.: US 11,810,241 B2
(45) Date of Patent: Nov. 7, 2023

(54) SYSTEMS AND METHODS FOR RAY TRACED CONTACT SHADOWS

(71) Applicant: Electronic Arts Inc., Redwood City, CA (US)

(72) Inventor: Dustin Hulm, Seattle, WA (US)

(73) Assignee: Electronic Arts Inc., Redwood City, CA (US)

(*) Notice: Subject to any disclaimer, the term of this patent is extended or adjusted under 35 U.S.C. 154(b) by 63 days.

(21) Appl. No.: 17/710,419

(22) Filed: Mar. 31, 2022

(65) Prior Publication Data

US 2023/0316630 A1 Oct. 5, 2023

(51) Int. Cl.
*G06T 15/06* (2011.01)
*G06T 15/20* (2011.01)
*G06T 7/50* (2017.01)
*G06T 7/13* (2017.01)

(52) U.S. Cl.
CPC ............ *G06T 15/06* (2013.01); *G06T 7/13* (2017.01); *G06T 7/50* (2017.01); *G06T 15/20* (2013.01)

(58) Field of Classification Search
None
See application file for complete search history.

(56) References Cited

PUBLICATIONS

Mo et al. ("Fast Hard and Soft Shadow Generation on Complex Models using Selective Ray Tracing", 2009. (Year: 2009).*
Bunnell et al. "GPU Gems," Chapter 11. Shadow Map Antialiasing, NVIDIA Corporation, 5th Printing (Sep. 2007).

* cited by examiner

Primary Examiner — Nicholas R Wilson
(74) Attorney, Agent, or Firm — Leydig, Voit & Mayer, Ltd.

(57) ABSTRACT

A method, device, and computer-readable storage medium for generating shadows in an image of a scene. The method includes: generating a shadow map to determine pixels in shadow; for each pixel in shadow, performing a sampling of neighboring pixels; for each pixel in shadow, computing an average brightness of the sampling to generate a shadow mapped shadow value; determining a set of close shadow edge pixels, which are shadow edge pixels that correspond to locations on an object that are below a threshold distance to an occluding object; for each pixel in the set of close shadow edge pixels, performing ray tracing to determine a ray traced shadow value; and outputting shadow values for pixels in shadow, wherein the output is based on the ray traced shadow value for the close shadow edge pixels, and the output is based on the shadow mapped shadow value for other shadow pixels.

20 Claims, 11 Drawing Sheets

SYSTEMS AND METHODS FOR RAY TRACED CONTACT SHADOWS

FIELD

This disclosure generally relates to computer graphics and, more particularly, to systems and methods for ray traced contact shadows.

BACKGROUND

Computer-generated images are often created by examining a geometric model of a view space and modeled objects in the view space. The geometric model of the objects can have arbitrary resolution, but typically each object is represented by a finite number of polygons, such as triangles, positioned in the view space and having a color, color pattern, and/or texture over their surface. An image is typically output (e.g., stored, displayed, transmitted, or otherwise processed) as a pixel array.

In some conventional implementations to real-time rendering, shadows in a scene are rendered as opaque shadows, which means that each object produces a dark shadow, regardless of the transparency of the object. In some applications, such as video games, computational speed is a priority. In video games, frames are rendered very quickly, e.g., in real-time or near real-time, as a user interacts with a video game.

As such, conventional ray tracing techniques (which can take hours or days to render a single frame) for rendering shadows are typically not suitable for video games. Some conventional approaches to generating shadows in real-time applications use shadow mapping. Shadow mappings involves looking out from a light source, where all of the objects the light source can see would appear in light. Anything behind those objects, however, would be in shadow. This is the basic principle used to create a shadow map.

However, one problem with using shadow mapping in real-time applications, such as video games, is an aliasing problem in the form of jagged, and sometimes magnified, staircase edge shadows. Since objects are modeled using a finite set of polygons, shadows generated using shadow mapping would have the same edges, which can be magnified depending on the location of the light source relative to the object that casts the shadow. Various techniques are known to anti-alias shadow maps to remove jagged edges, but these techniques can sometimes result is blurry shadow edges that do not accurately represent the shadow being cast.

As such, there remains a need in the art for a system and method for rendering shadows that overcome the drawbacks and limitations of existing approaches.

SUMMARY

Embodiments of the disclosure provide a method, device, and computer-readable storage medium for generating shadows in an image of a scene. The method comprises: generating, by one or more processors, a shadow map to determine which pixels in screen space are in shadow; for each pixel identified as being in shadow in the shadow map, performing, by the one or more processors, a sampling of neighboring pixels; for each pixel identified as being in shadow in the shadow map, computing, by the one or more processors, an average brightness of the sampling of neighboring pixels in the shadow map to generate a shadow mapped shadow value for the pixel; determining, by the one or more processors, a set of close shadow edge pixels, wherein each pixel in the set of close shadow edge pixels is an edge pixel on a border between a shadow region and a non-shadow region, and wherein each pixel in the set of close shadow edge pixels corresponds to a location on an object that is below a threshold distance to an occluding object in a direction towards a light source; for each pixel in the set of close shadow edge pixels, performing, by the one or more processors, ray tracing from the location on the object corresponding to the pixel to determine a ray traced shadow value for the pixel; and outputting, by the one or more processors, shadow values for the pixels identified as being in shadow in the shadow map, wherein for pixels in the set of close shadow edge pixels, the shadow value is based on the ray traced shadow value, and wherein the shadow value is based on the shadow mapped shadow value for pixels in shadow other than the pixels in the set of close shadow edge pixels.

DETAILED DESCRIPTION

The following detailed description is exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description.

Ray tracing is a costly feature to implement in video games, even with ray tracing accelerated hardware. Since the computation budget for ray tracing is limited, existing implementations often require a compromise on frame rate, resolution, or other aspects to run efficiently. Embodiments of the disclosure provide a technique for rendering shadows using a hybrid of shadow mapping (for example, percentage closer filtering (PCF) shadow mapping) and ray traced shadows.

In one embodiment, a shadow map is generated for an image of a scene. For each pixel identified as being in shadow, a sampling of neighboring pixels is performed, such as by using PCF. The average brightness of the samples can be computed to generate a shadow value for the pixel. In addition, in some embodiments, for pixels on a shadow edge, while performing the sampling, a distance is measured from a location of the sample in shadow and the occluding object. If the distance is below a threshold distance, then the pixel corresponding to the sample is tagged as a pixel that should be ray traced. Each of the shadow edge pixels that are tagged to be ray traced are then ray traced towards the light source using a single ray to generate a shadow value for the pixel. In some embodiments, the ray traced result can be used instead of the average brightness of the samples from shadow mapping for the final shadow output for that pixel. In other embodiments, the ray traced result may be blended with the result of shadow mapping.

Taking the context of video games as an example, the display of a video game is generally a video sequence presented to a display device capable of displaying the video sequence. The video sequence typically comprises a plurality of frames. By showing frames in succession in sequence order, simulated objects appear to move. A game engine typically generates frames in real-time in response to user input, so rendering time is often constrained.

As used herein, a "frame" refers to an image of the video sequence. In some systems, such as interleaved displays, the frame might comprise multiple fields or more complex constructs, but generally a frame can be thought of as a view into a computer-generated scene at a particular time or short time window. For example, with 60 frames-per-second video, if one frame represents the scene at t=0 seconds, then the next frame would represent the scene at t=1/60 seconds. In some cases, a frame might represent the scene from t=0 seconds to t=1/60 seconds, but in the simple case, the frame is a snapshot in time.

A "scene" comprises those simulated objects that are positioned in a world coordinate space within a view pyramid, view rectangular prism, or other shaped view space. In some approaches, the scene comprises all objects (that are not obscured by other objects) within a view pyramid defined by a view point and a view rectangle with boundaries being the perspective planes through the view point and each edge of the view rectangle, possibly truncated by a background.

The simulated objects can be generated entirely from mathematical models describing the shape of the objects (such as arms and a torso described by a set of plane and/or curve surfaces), generated from stored images (such as the face of a famous person), or a combination thereof If a game engine (or more specifically, a rendering engine that is part of the game engine or used by the game engine) has data as to where each object or portion of an object is in a scene, the frame for that scene can be rendered using standard rendering techniques.

A scene may comprise several objects or entities with some of the objects or entities being animated, in that the objects or entities may appear to move either in response to game engine rules or user input. For example, in a basketball game, a character for one of the basketball players might shoot a basket in response to user input, while a defending player will attempt to block the shooter in response to logic that is part of the game rules (e.g., an artificial intelligence component of the game rules might include a rule that defenders block shots when a shot attempt is detected) and when the ball moves through the net, the net will move in response to the ball. The net is expected to be inanimate, but the players' movements are expected to be animated and natural-appearing. Animated objects are typically referred to herein generically as characters and, in specific examples, such as animation of a football, soccer, baseball, basketball, or other sports game, the characters are typically simulated players in the game. In many cases, the characters correspond to actual sports figures and those actual sports figures might have contributed motion capture data for use in animating their corresponding character. Players and characters might be nonhuman, simulated robots, or other character types.

Figure 1:
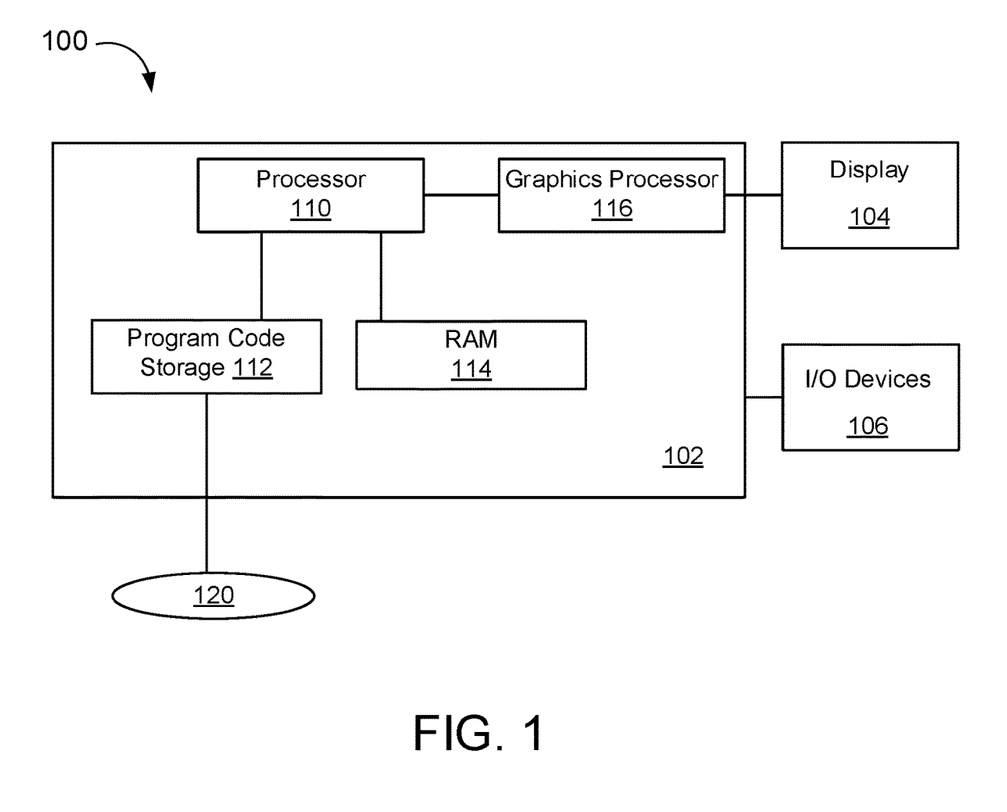
FIG. 1 is a block diagram of a computer system for rendering images, according to aspects of the present disclosure.

Turning to the drawings, FIG. 1 is a block diagram of a computer system 100 for rendering images, according to aspects of the present disclosure. The computer system 100 may be, for example, used for rendering images of a video game. The computer system 100 is shown comprising a console 102 coupled to a display 104 and input/output (I/O) devices 106. Console 102 is shown comprising a processor 110, program code storage 112, temporary data storage 114, and a graphics processor 116. Console 102 may be a handheld video game device, a video game console (e.g., special purpose computing device) for operating video games, a general-purpose laptop or desktop computer, or other suitable computing system, such as a mobile phone or tablet computer. Although shown as one processor in FIG. 1, processor 110 may include one or more processors having one or more processing cores. Similarly, although shown as one processor in FIG. 1, graphics processor 116 may include one or more processors having one or more processing cores.

Program code storage 112 may be ROM (read only-memory), RAM (random access memory), DRAM (dynamic random access memory), SRAM (static random access memory), hard disk, other magnetic storage, optical storage, other storage or a combination or variation of these storage device types. In some embodiments, a portion of the program code is stored in ROM that is programmable (e.g., ROM, PROM (programmable read-only memory), EPROM (erasable programmable read-only memory), EEPROM (electrically erasable programmable read-only memory), etc.) and a portion of the program code is stored on removable media such as a disc 120 (e.g., CD-ROM, DVD-ROM, etc.), or may be stored on a cartridge, memory chip, or the like, or obtained over a network or other electronic channel as needed. In some implementations, program code can be found embodied in a non-transitory computer-readable storage medium.

Temporary data storage 114 is usable to store variables and other game and processor data. In some embodiments, temporary data storage 114 is RAM and stores data that is generated during play of a video game, and portions thereof may also be reserved for frame buffers, depth buffers, polygon lists, texture storage, and/or other data needed or usable for rendering images as part of a video game presentation.

In one embodiment, I/O devices 106 are devices a user interacts with to play a video game or otherwise interact with console 102. I/O devices 106 may include any device for interacting with console 102, including but not limited to a video game controller, joystick, keyboard, mouse, keypad, VR (virtual reality) headset or device, etc.

Display 104 can any type of display device, including a television, computer monitor, laptop screen, mobile device screen, tablet screen, etc. In some embodiments, I/O devices 106 and display 104 comprise a common device, e.g., a touchscreen device. Still further, in some embodiments, one or more of the I/O devices 106 and display 104 is integrated in the console 102.

In various embodiments, since a video game is likely to be such that the particular image sequence presented on the display 104 depends on results of game instruction processing, and those game instructions likely depend, in turn, on user inputs, the console 102 (and the processor 110 and graphics processor 116) are configured to quickly process inputs and render a responsive image sequence in real-time or near real-time.

Various other components may be included in console 102, but are omitted for clarity. An example includes a networking device configured to connect the console 102 to a network, such as the Internet.

Figure 2:
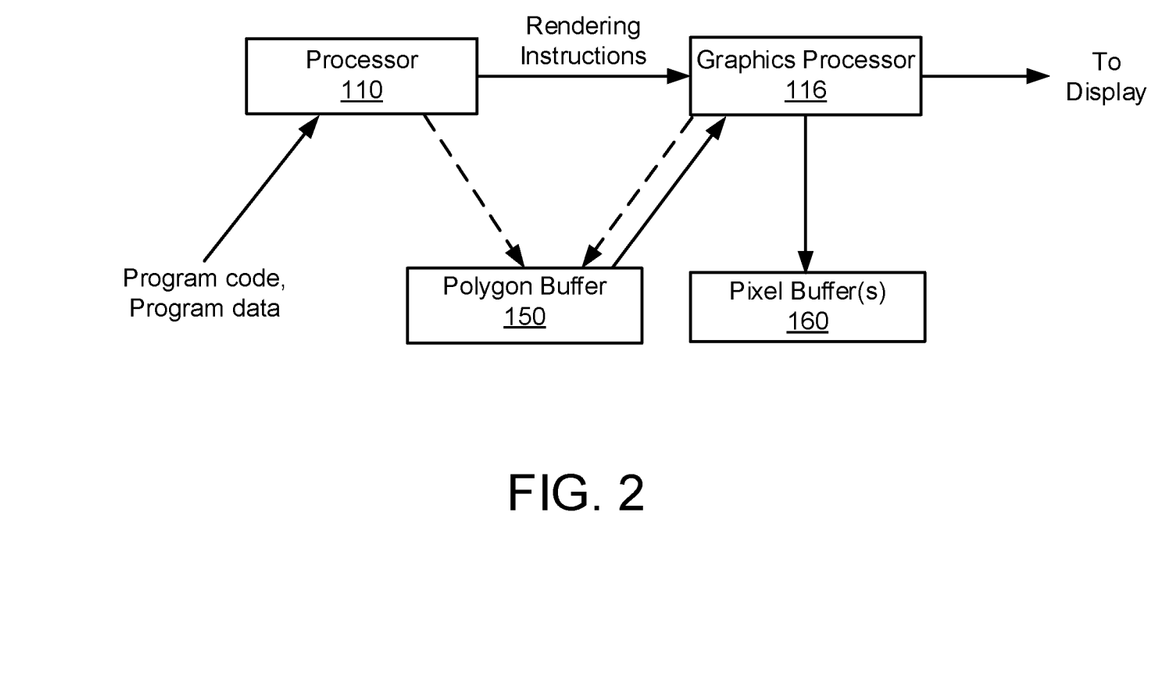
FIG. 2 is a block diagram illustrating processor and buffer interaction, according to one embodiment.

FIG. 2 is a block diagram illustrating processor and buffer interaction, according to one embodiment. As shown in FIG. 2, processor 110 executes program code and program data. In response to executing the program code, processor 110 outputs rendering instructions to graphics processor 116. Graphics processor 116, in turn, reads data from a polygon buffer 150 and interacts with pixel buffer(s) 160 to form an image sequence of one or more images that are output to a display. Alternatively, instead of sending rendering instructions to graphics processor 116 or in addition to sending rendering instructions to graphics processor 116, processor 110 may directly interact with polygon buffer 150. For example, processor 110 could determine which objects are to appear in a view and provide polygon or other mathematical representations of those objects to polygon buffer 150 for subsequent processing by graphics processor 116.

In one example implementation, processor 110 issues high-level graphics commands to graphics processor 116. In some implementations, such high-level graphics commands might be those specified by the OpenGL specification, or those specified by a graphics processor manufacturer.

In one implementation of an image rendering process, graphics processor 116 reads polygon data from polygon buffer 150 for a polygon, processes that polygon and updates pixel buffer(s) 160 accordingly, then moves on to the next polygon until all the polygons are processed, or at least all of the polygons needing to be processed and/or in view are processed. As such, a renderer processes a stream of polygons, even though the polygons may be read in place and be a finite set, where the number of polygons is known or determinable. For memory efficiency and speed, it may be preferable in some implementations that polygons be processed as a stream (as opposed to random access, or other ordering), so that fast, expensive memory used for polygons being processed is not required for all polygons comprising an image.

In some embodiments, processor 110 may load polygon buffer 150 with polygon data in a sort order (if one is possible, which might not be the case where there are overlapping polygons), but more typically polygons are stored in polygon buffer 150 in an unsorted order. It should be understood that although these examples use polygons as the image elements being processed, the apparatus and methods described herein can also be used on image elements other than polygons.

Figure 3:
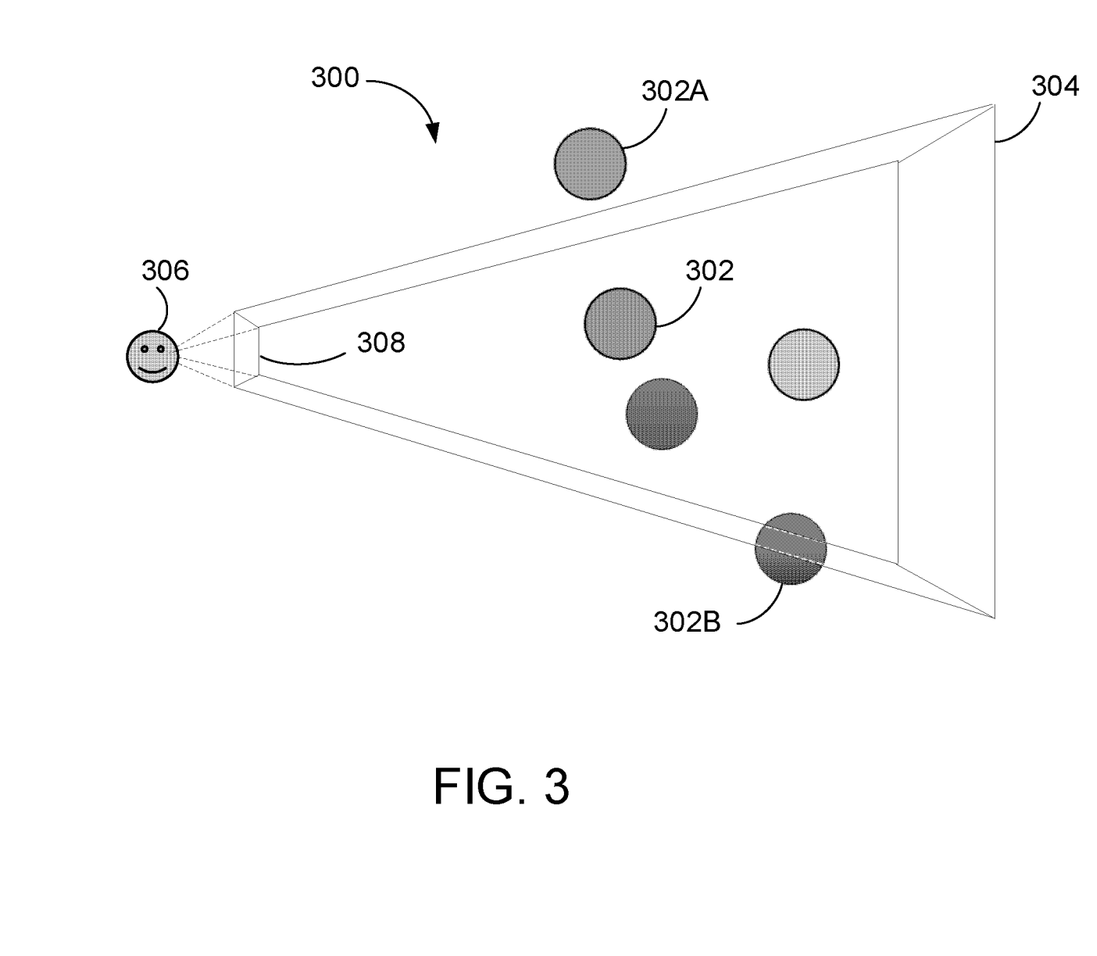
FIG. 3 is a block diagram of a scene to be rendered, according to one embodiment.

FIG. 3 is a block diagram of a scene 300 to be rendered, according to one embodiment. The scene 300 includes a plurality of 3D (three-dimensional) objects, including objects 302, 302A, 302B, for example. Each object can be comprised of a set of polygons, e.g., triangles. A camera 306 is configured to capture an image of the scene 300. A projection of the scene 300 is captured by the camera 306 and is represented by screen space 308. The view of the scene 300 captured by the camera 306 is represented by viewport 304. As shown, some of the objects, such as object 302A of the scene 300, may be outside the viewport 304. As also shown, some of the objects, such as object 302B, may be partially outside the viewport 304.

In one embodiment, the image of the scene 300 that is displayed on a display device corresponds to the screen space 308. The view of the scene 300 that the camera 306 can see (e.g., the image represented by screen space 308) can change as the camera 306 moves in 3D space relative to the objects in the scene. Also, the objects can move in the scene 300.

Figure 4A:
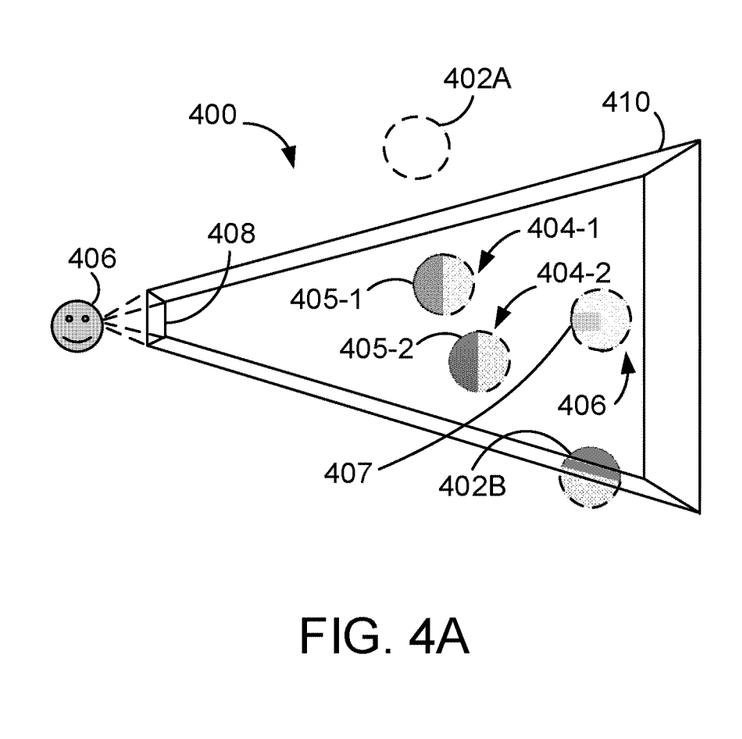
FIG. 4A is a block diagram illustrating rendering of a scene, according to one embodiment.

FIG. 4A is a block diagram illustrating rendering of a scene 400, according to one embodiment. Similar to the diagram shown in FIG. 3, scene 400 includes a plurality of objects. A camera 406 is configured to capture an image of the scene 400, represented in screen space 408. The camera 406 observes the scene 400 through viewport 410.

Various techniques can be used to render the scene 400 in screen space, including rasterization, ray tracing, or other techniques. Rasterization strives to render the pixels as those that are directly visible from the camera 406. In some implementations, rasterization can provide good performance when the renderer (e.g., processor 110 and/or graphics processor 116) does not need any global information about the scene 400.

One rasterization algorithm takes the 3D scene 400, which is described as objects comprising polygons, and renders the scene onto a 2D surface, usually a computer monitor, in screen space 408. The polygons are themselves represented as collections of triangles. Each triangle is represented by three vertices in 3D space. At a very basic level, rasterizers take a stream of vertices, transform them into corresponding 2D points in screen space 408, and fill in the transformed 2D triangles as appropriate.

Rasterization typically involves culling one or more objects or partial objects. Frustum culling removes any objects outside the viewport 410, such as object 402A. Viewport culling removes portions of objects that are partially overlapping the edge of the viewport 410, such as a portion of object 402B. Backface culling removes a back portion of objects that cannot be seen by the camera 406. For example, backface culling removes portions 404-1 and 404-2 of objects 405-1 and 405-2, respectively. In some embodiments, depth testing can be performed to remove, on a per pixel basis in screen space 408, portions of objects that are occluded by other objects. For example, depth testing removes portion 406 of object 407 that is occluded by objects 405-1 and 405-2.

When rasterization is complete, an image of scene in screen space 408 is generated. In some embodiments, pixel density of the screen space 408 can also result in information loss about the objects in the scene 400.

Figure 4B:
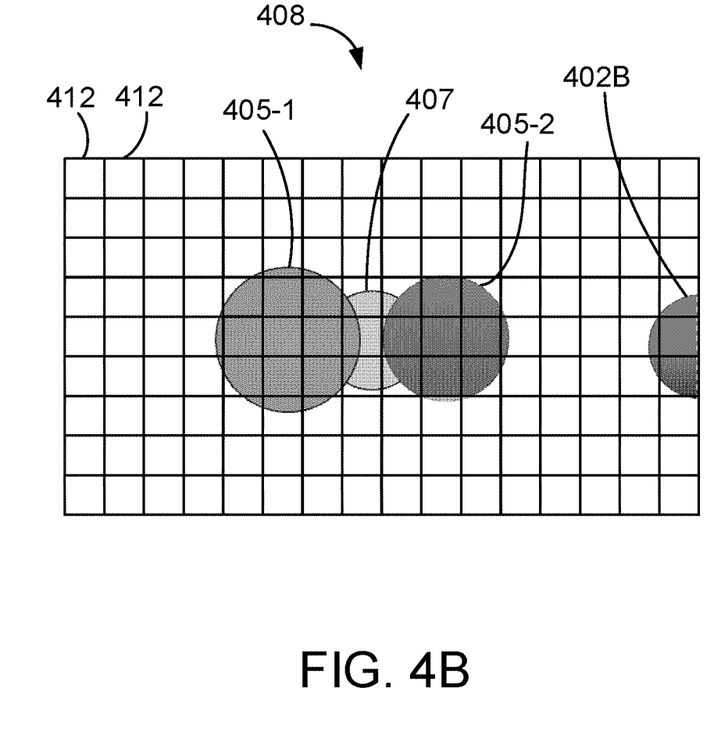
FIG. 4B is an example of an image of a scene, according to one embodiment.

FIG. 4B is an example of an image of a scene, according to one embodiment. The image shown in FIG. 4B represents the image in screen space 408 of the scene 400 captured by the camera 406 in FIG. 4A.

For each pixel 412 in screen space 408, the processor has access to data corresponding to the position of the object within the pixel, the color of the object, the object's orientation, properties of the object (e.g., transparency or translucency), and/or surface roughness information, etc. The result of rasterization is, therefore, a 2D image of the 3D scene.

Although rendering has been described herein using rasterization, other embodiments may involve rendering a scene using other techniques, such as ray tracing, ray casting, radiosity, or any other rendering technique or combination thereof.

Figure 5:
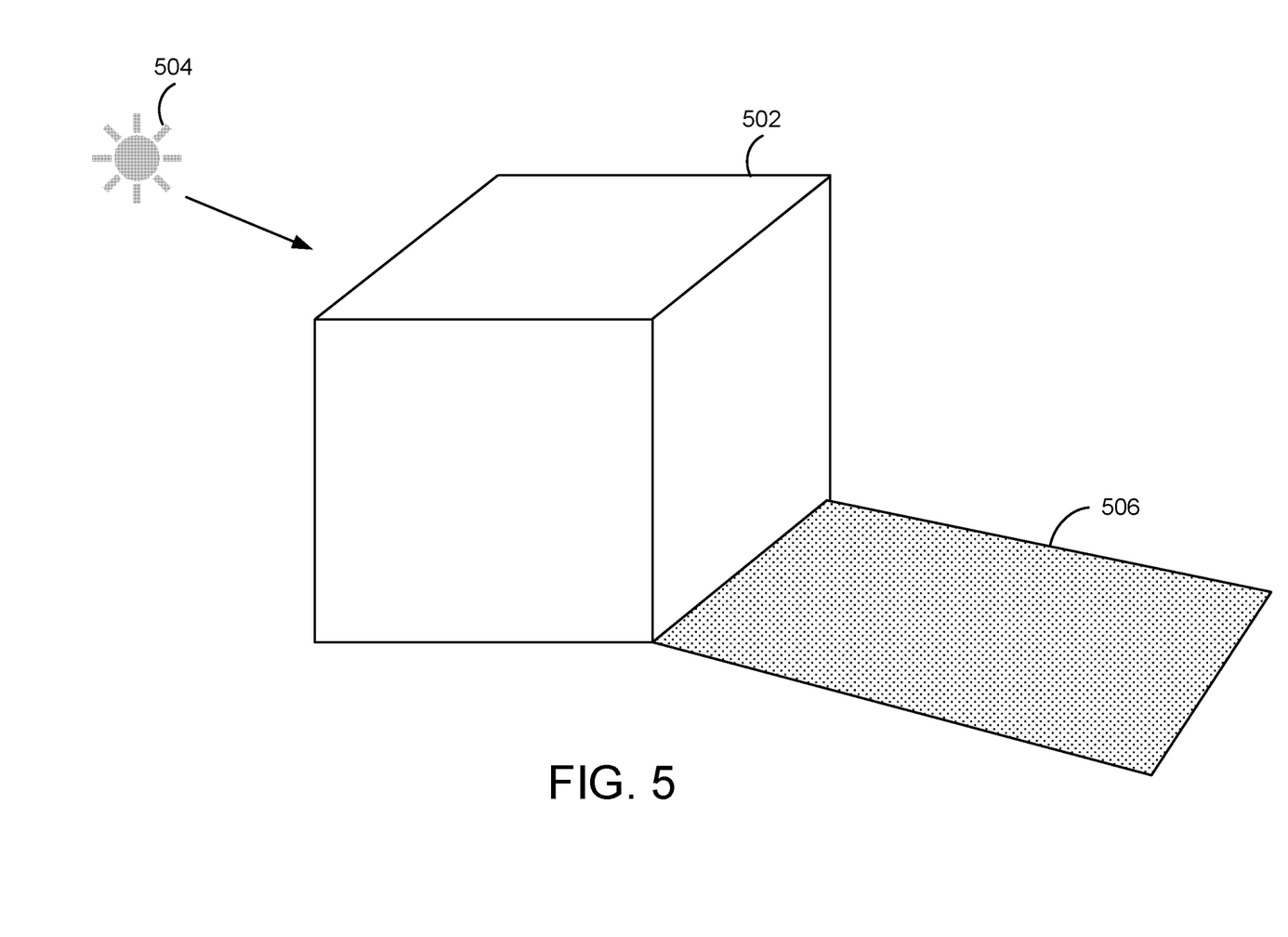
FIG. 5 is an example of a shadow cast by an object, according to one embodiment.

FIG. 5 is an example of a shadow 506 cast by an object 502, according to one embodiment. In one embodiment, the object 502 may be formed as a polygonal mesh. The polygonal mesh comprises a collection of vertices, edges, and faces that define the shape and/or boundary of the object 502. The faces may include various polygonal shapes, such as triangles, quadrilaterals, convex polygons, concave polygons, regular polygons (e.g., polygons that may have equal length sides and may have equal angles) and/or irregular polygons (e.g., polygons that may not have equal length sides and may not have equal angles).

A light source 504 emits light to illuminate a scene that includes the object 502. The light source 504 causes a shadow 506 to be cast by the object 502. In the example shown, object 502 is an opaque object that casts a dark shadow. One technique to generate shadow information for a scene is to generate a shadow map.

Figure 6:
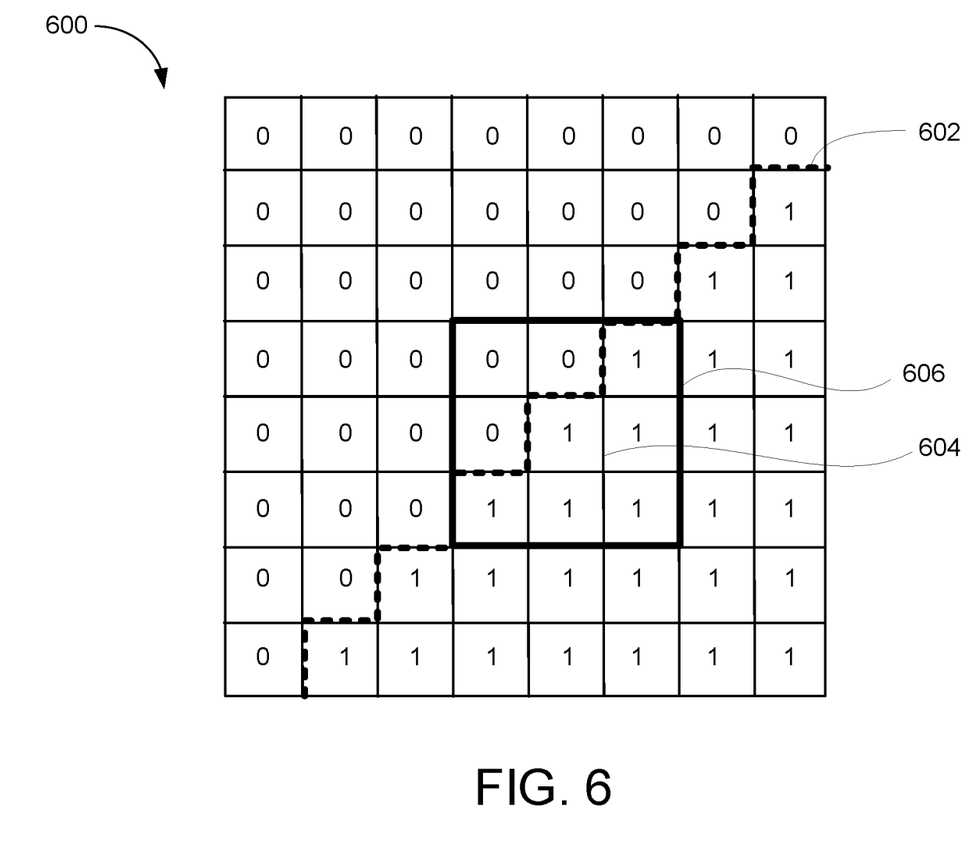
FIG. 6 is an example of a shadow map, according to one embodiment.

FIG. 6 is an example of a shadow map 600, according to one embodiment. In some embodiments, to create the shadow map 600, a first step is to renders the scene from a point of view of a light source. For a point light source, the view can be a perspective projection as wide as its desired angle of effect. For directional light (e.g., that from the sun), an orthographic projection may be used. From this rendering, a depth map is extracted and saved that indicates how far each object is from the light source. Because only the depth information is relevant for the depth map, it is common to avoid updating the color buffers and all lighting and texture calculations for this rendering may be disabled, in order to save drawing time. This depth map is often stored as a texture in graphics memory.

In some embodiments, the second step for creating the shadow map 600 is to draw the scene from the camera viewpoint. The coordinates of the objects in the image to be rendered are determined, and a test is performed that compares those coordinates against the depth map to determine which pixels are in shadow and which pixels are not in shadow, thus creating the shadow map 600. In one embodiment, the shadow map 600 is either 0 or 1 for each pixel, where 0 represents a pixel in screen space not in shadow, and 1 represents a pixel in screen space that is in shadow (or vice versa). Once the shadow map 600 is generated, objects are drawn either in shadow or in light based on the shadow map 600.

As shown in FIG. 6, a shadow edge 602 is formed between pixels that are in shadow and pixels that are not in shadow. In one embodiment, shadow pixels may be determined to be at the shadow edge if one or more of the eight (8) surrounding pixels (e.g., up, down, left, right, and four diagonals) is not in shadow. As described, this shadow edge 602 can introduce aliasing artifacts. In some embodiments, an anti-aliasing technique can be applied to minimize aliasing effects.

One such anti-aliasing technique is called percentage closer filtering (PCF). For each pixel that is identified to be at the shadow edge, such as pixel 604, a set of neighboring pixels 606 is identified. In one embodiment, the set of neighboring pixels 606 may include the eight (8) surrounding pixels (e.g., up, down, left, right, and four diagonals), thus creating a 3×3 kernel. In one embodiment, an average value can then be computed of the pixel 604 and the set of neighboring pixels 606 to compute an updated shadow value for the pixel. In the example shown, a nine-pixel average is computed for pixel 606, resulting in a pixel value of 0.667 (e.g., 6/9). In other embodiments, the more pixels may be sampled, such as by creating a 4×4 or 16×16 kernel around the pixel in question. In other embodiments, the set of neighboring pixels that is identified can be sampled and the samples are aggregated to generate a shadow value for the pixel.

Figure 7:
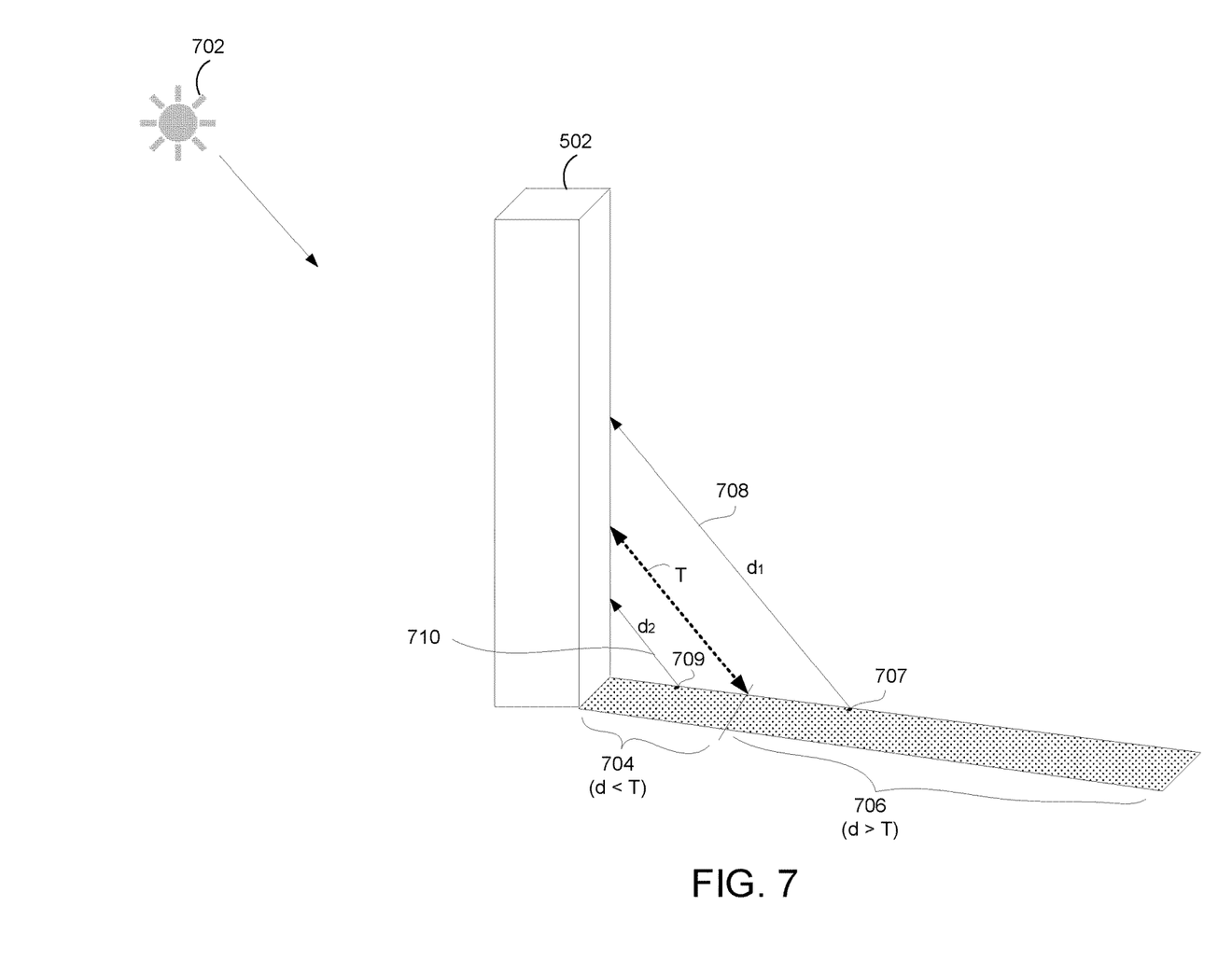
FIG. 7 is a conceptual diagram illustrating a shadow generated by a combination of shadow mapping and ray tracing, according to one embodiment.

FIG. 7 is a conceptual diagram illustrating a shadow generated by a combination of shadow mapping and ray tracing, according to one embodiment. In some embodiments, the anti-aliased shadows generated by shadow mapping (e.g., shadow mapping with PCF) may not be visually accurate. For example, shadow edges at locations that are very close to a casting object may appear blurry, when a more accurate shadow edge would appear as a hard line. As such, embodiments of the disclosure address this problem by generating shadows for some pixels using ray tracing, which gives more accurate results.

In some embodiments, the shadow edge pixels are identified. For each shadow edge pixel, a distance (d) is measured from a location on an object corresponding to the shadow edge pixel to a location of the occluding object in the direction of the light source 702. If the distance (d) is below a threshold distance (T), then the pixel is identified as pixel that should be ray traced.

In the example shown in FIG. 7, shadow edge pixel 707 corresponds to a location on an object. The distance from that location to the occluding object in the direction of the light source 702 is $d_1$. The value of $d_1$ is greater than the threshold distance (T).

Shadow edge pixel 709 corresponds to a location on an object. The distance from that location to the occluding object in the direction of the light source 702 is $d_2$. The value of $d_2$ is less than the threshold distance (T).

As shown in the example in FIG. 7, shadow edge pixels in region 704 correspond to locations where the distance (d) to the occluding object is less than the threshold distance (T), and shadow edge pixels in region 706 correspond to locations where the distance (d) to the occluding object is greater than the threshold distance (T). As such, the shadow edge pixels in region 704 are identified as pixels for ray tracing; whereas, shadow edge pixels in region 706 are not ray traced and the shadow value can be generated by shadow mapping.

Figure 8:
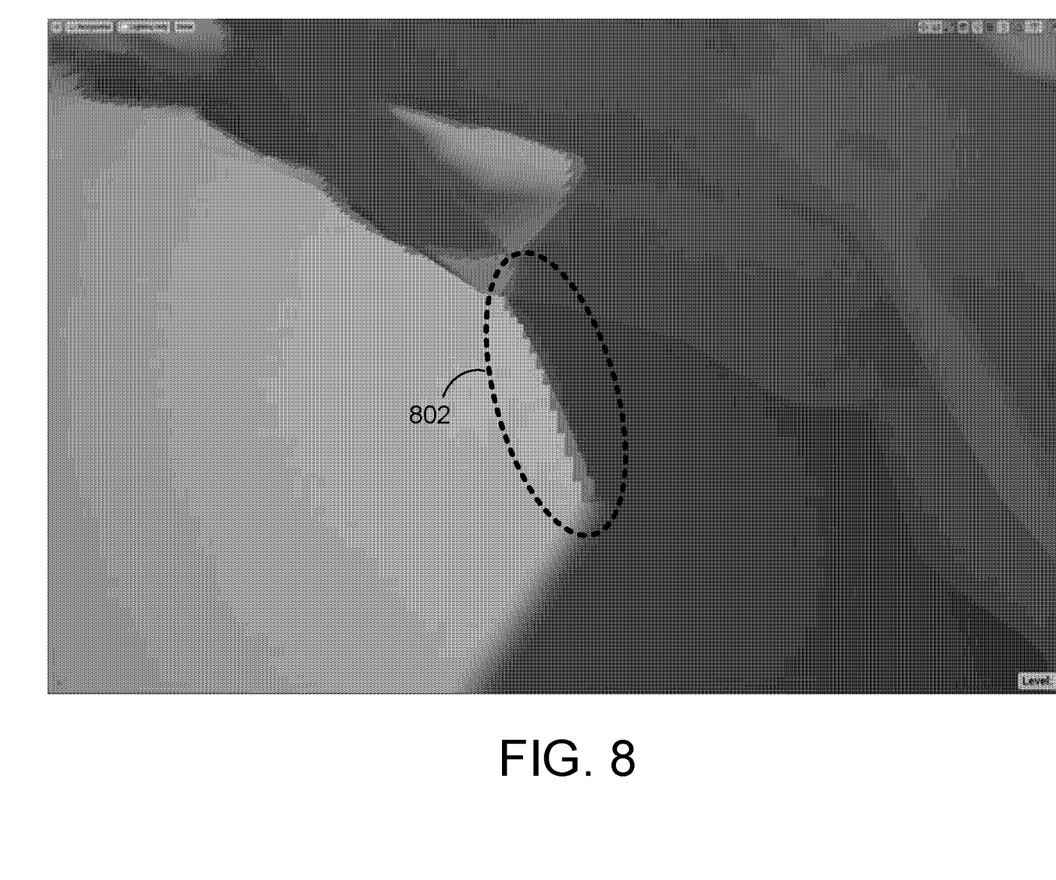
FIG. 8 is a screenshot illustrating an image of a scene that includes a shadow, according to one embodiment.

FIG. 8 is a screenshot illustrating an image of a scene that includes a shadow, according to one embodiment. Shadow edge pixels in region 802 are identified as pixels where a distance from a location on an object (e.g., the ground surface) to the occluding object (e.g., a rock) is less than a threshold distance. The shadow edge pixels in region 802 are thus identified for ray tracing.

Figure 9:
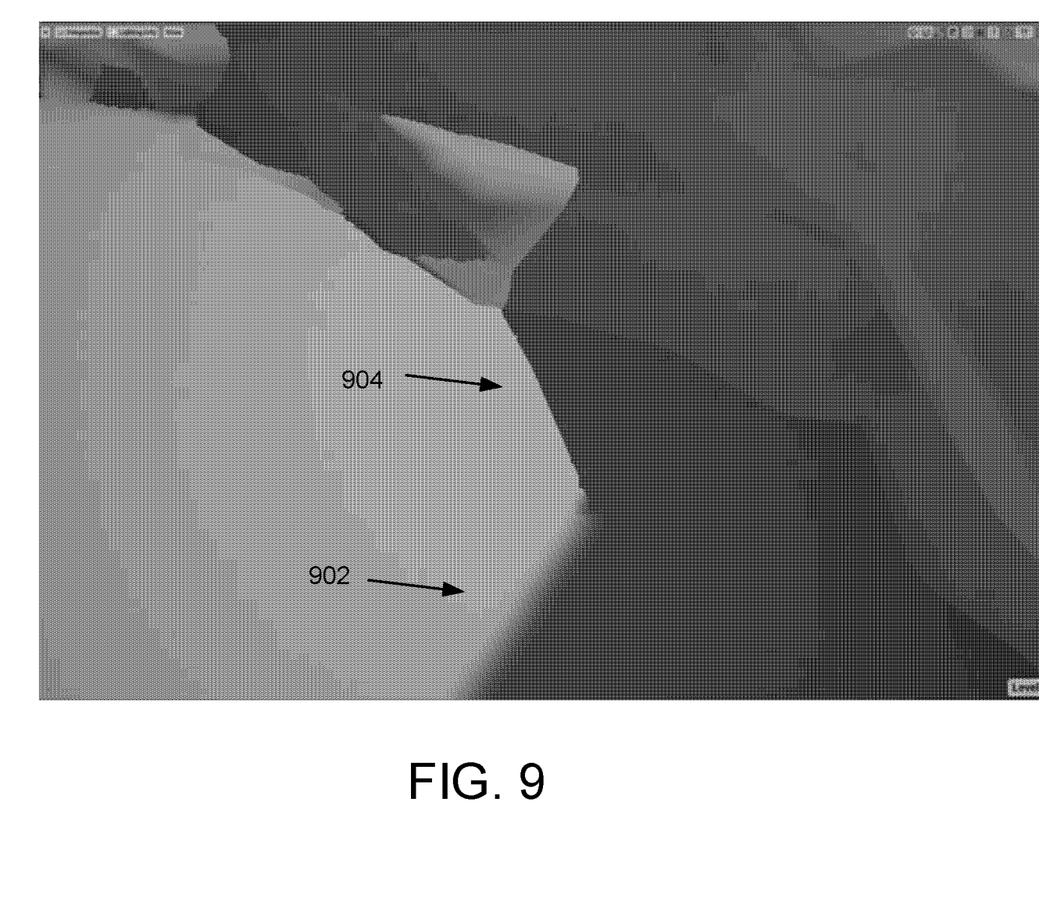
FIG. 9 is a screenshot illustrating an image of a scene that includes a shadow generated by a combination of shadow mapping and ray tracing, according to one embodiment.

FIG. 9 is a screenshot illustrating an image of a scene that includes a shadow generated by a combination of shadow mapping and ray tracing, according to one embodiment. Referring to FIG. 8, the shadow edge pixels in region 802 have been identified for ray tracing. After these pixels are ray traced, shadow information is generated for these pixels. In one embodiment, performing the ray tracing comprises casting a single ray toward the light source. If the ray does not hit any objects before reaching the light source, the ray tracing result indicates that the pixel is not is shadow. If the ray hits an object before reaching the light source, the ray tracing result indicates that the pixel is in shadow. As shown in FIG. 9, the pixels in region 904 have been ray traced, thus resulting in a hard line shadow edge. By contrast, the pixels in region 902 correspond to locations on an object (e.g., the ground surface) where the distance to the occluding object (e.g., a rock) is greater than the threshold distance. Shadows for the pixels in region 902 are generated using shadow mapping (with anti-aliasing, such as with PCF), resulting in a blurry edge shadow.

Figure 10:
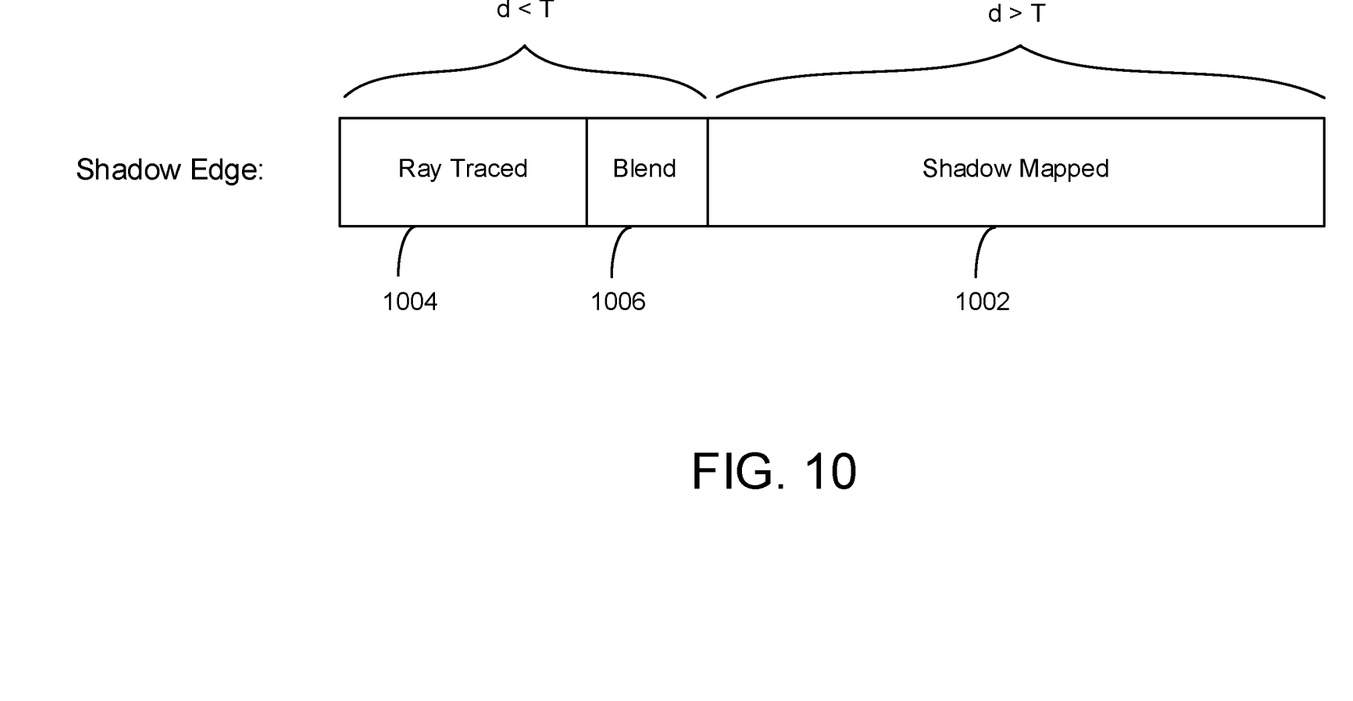
FIG. 10 is a conceptual diagram illustrating shadow a shadow edge composed of a first portion formed by shadow mapping, a second portion formed by ray tracing, and a third portion formed by a combination of shadow mapping and ray tracing, according to one embodiment.

In some embodiments, the interface between shadow edge pixels generated by ray tracing and the shadow edge pixels generated by shadow mapping can be smoothed. FIG. 10 is a conceptual diagram illustrating a shadow edge composed of a first portion 1002 formed by shadow mapping, a second portion 1004 formed by ray tracing, and a third portion 1006 formed by a combination (blend) of shadow mapping and ray tracing, according to one embodiment. The pixels in regions 1004 and 1006 have been identified as pixels corresponding to locations on an object where the distance to the occluding object is less than the threshold distance, thus those shadow edge pixels are ray traced. The shadow output for the pixels in regions 1004 and 1006 is therefore based on the results of the ray tracing. The results of the shadow mapping are used as the shadow output for the pixels in region 1002.

In some embodiments, for the pixels in region 1006, the shadow output is a blend between the results of the shadow mapping and ray tracing. For example, weighting values can be applied linearly among the results of the shadow mapping and the results of ray tracing. In some implementations, the region 1006 may be identified as a subset of the pixels whose distance to the occluding object is less than the threshold distance. For example, the region 1006 may correspond to a region where d<T, and also d>N*T, where N is a factor less than 1.0 (e.g., 0.90). In other embodiments, the region 1006 may correspond to a region where d<T, and also d>T−M, where M is a distance amount in world space (e.g., 25 cm).

Figure 11:
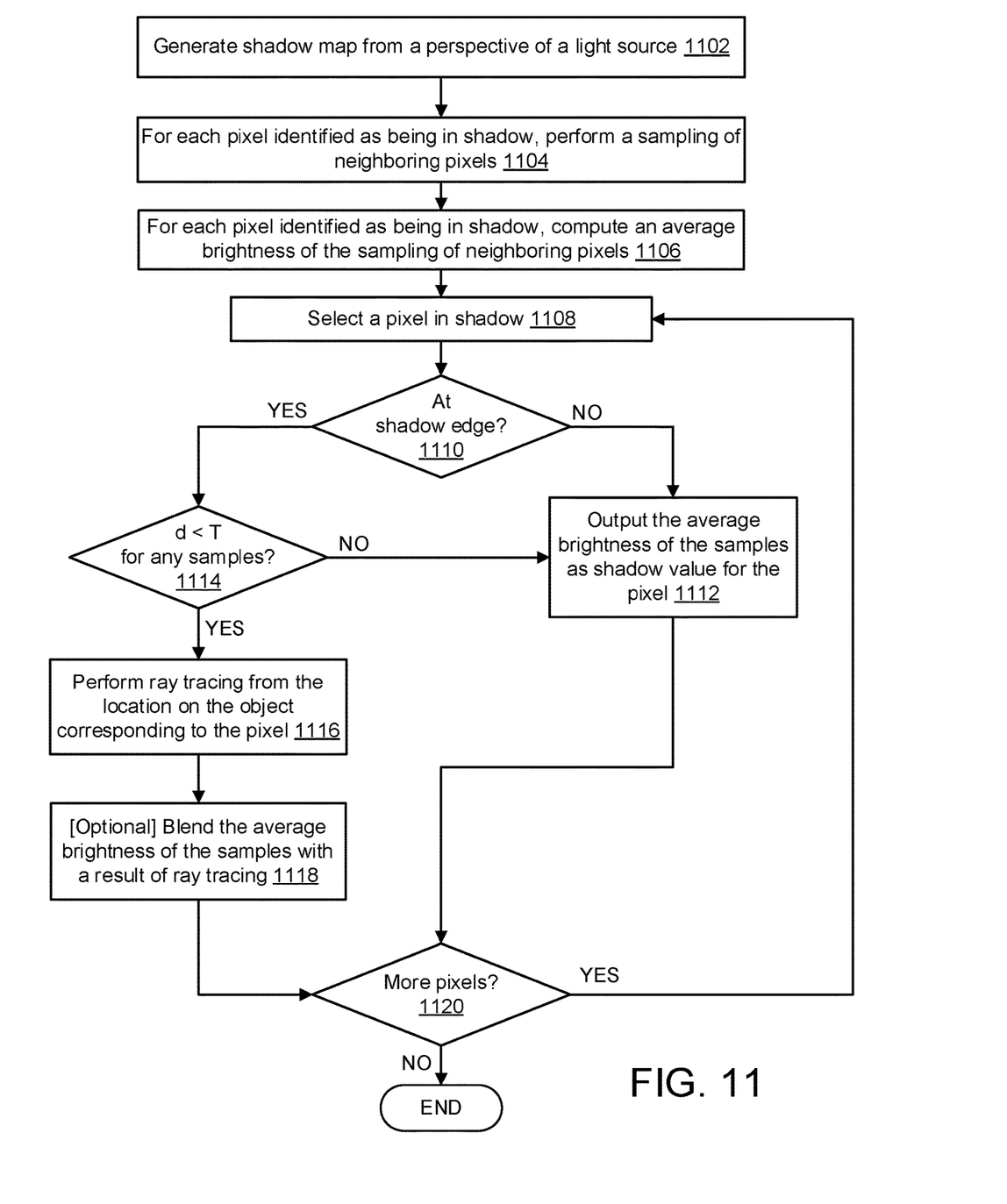
FIG. 11 is a flow diagram of method steps for generating shadows in an image of scene, according to one embodiment.

FIG. 11 is a flow diagram of method steps for generating shadows in an image of scene, according to one embodiment. In various implementations, the method can be performed by the processor 110, the graphics processor 116, or a combination of the processor 110 and the graphics processor 116.

As shown, the method begins at step 1102, where the processor generates shadow map from a perspective of a light source to determine which pixels in screen space are in shadow. As described, in one embodiment, a depth map is first created from the perspective of the light source. Then the scene is drawn from a camera viewpoint. For each pixel, coordinates of the object in screen space are compared to the depth map to determine which pixels are in shadow, thus creating the shadow map.

At step 1104, for each pixel identified as being in shadow in the shadow map, the processor performs a sampling of neighboring pixels. In some embodiments, the sampling may select a set of eight (8) neighboring pixels (e.g., up, down, left, right, and four diagonals). At step 1106, for each pixel identified as being in shadow in the shadow map, the processor computes an average brightness of the sampling of neighboring pixels.

At step 1108, the processor selects a pixel identified as being in shadow for processing. At step 1110, the processor determines whether the selected pixel is at a shadow edge. In one embodiment, a shadow pixel may be determined to be at the shadow edge if one or more of the eight (8) surrounding pixels in the shadow map (e.g., up, down, left, right, and four diagonals) is not in shadow. If, at step 1110, the processor determines that the pixel is not at the shadow edge, then at step 1112, the processor outputs the average brightness of the samples as a shadow value for the pixel.

If, at step 1110, the processor determines that the pixel is at the shadow edge, then at step 1114, the processor determines whether any samples for the pixel correspond to a location on an object that is below a threshold distance to an occluding object. In some embodiments, the threshold distance is configurable based on the type of light source. For example, the threshold distance may be longer (for example, 150-300 cm threshold distance) for sunlight compared to a spot light (for example, 20-25 cm threshold distance).

If, at step 1114, the processor determines that none of the samples for the pixel correspond to a location on an object that is below the threshold distance to the occluding object, then the method proceeds to step 1112, where the processor outputs the average brightness of the samples as a shadow value for the pixel.

If, at step 1114, the processor determines that at least one of the samples for the pixel corresponds to a location on an object that is below the threshold distance to the occluding object, then at step 1116, the processor performs ray tracing from the location on the object corresponding to the pixel to generate a shadow value for the pixel (e.g., in shadow or not in shadow, as a result of ray tracing). In one embodiment, a single ray is cast towards the light source to generate the shadow value for the pixel.

At step 1118, the processor optionally blends the average brightness of the samples corresponding to the pixel with a result of ray tracing to generate the shadow value for the pixel. In some embodiments, the interface between shadow edge pixels generated by ray tracing and the shadow edge pixels generated by shadow mapping can be smoothed at step 1118. For example, weighting values can be applied linearly among the results of the shadow mapping and the results of ray tracing on the border between the shadow mapped results and the ray traced results.

At step 1120, the processor determines whether there are any more pixels to process. If yes, the method returns to step 1108. If not, the method terminates.

In sum, embodiments of the disclosure provide a technique for generating contact shadows, were a portion of the shadow is based on shadow mapping (cheaper) and a portion of the shadow is based on ray tracing (more computationally expensive). Those shadow edge pixels at locations that are within a threshold distance to an occluding object are ray traced, while other shadow pixels are generated by shadow mapping. By ray tracing just a subset of the shadow pixels, computational complexity is minimized while still providing more visually accurate results compared to simply using shadow mapping for all shadow pixels. Also, because ray tracing is performed over just a subset of shadow edge pixels, no denoising is needed for the ray traced results.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (e.g., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A method for generating shadows in an image of a scene, the method comprising:
   generating, by one or more processors, a shadow map to determine which pixels in screen space are in shadow;
   for each pixel identified as being in shadow in the shadow map, performing, by the one or more processors, a sampling of neighboring pixels;
   for each pixel identified as being in shadow in the shadow map, computing, by the one or more processors, an average brightness of the sampling of neighboring pixels in the shadow map to generate a shadow mapped shadow value for the pixel;
   determining, by the one or more processors, a set of close shadow edge pixels, wherein each pixel in the set of close shadow edge pixels is an edge pixel on a border between a shadow region and a non-shadow region, and wherein each pixel in the set of close shadow edge pixels corresponds to a location on an object that is below a threshold distance to an occluding object in a direction towards a light source;
   for each pixel in the set of close shadow edge pixels, performing, by the one or more processors, ray tracing from the location on the object corresponding to the pixel to determine a ray traced shadow value for the pixel; and
   outputting, by the one or more processors, shadow values for the pixels identified as being in shadow in the shadow map, wherein for pixels in the set of close shadow edge pixels, the shadow value is based on the ray traced shadow value, and wherein the shadow value is based on the shadow mapped shadow value for pixels in shadow other than the pixels in the set of close shadow edge pixels.

2. The method according to claim 1, wherein generating the shadow map comprises:
   generating a depth map from a point of view of the light source;
   rendering the scene from a camera viewpoint, including coordinates of objects corresponding to pixels in screen space;
   for each pixel in screen space, comparing the coordinates of the object in the pixel to the depth map to determine whether the pixel is in shadow or not in shadow; and
   generating the shadow map based on results of the comparing.

3. The method according to claim 1, wherein, for a given pixel, the sampling of neighboring pixels comprises selecting eight neighboring pixels of the given pixel in the shadow map, including a pixel above the given pixel, a pixel below the given pixel, a pixel to the left of the given pixel, a pixel to the right of the given pixel, and four diagonal pixels.

4. The method according to claim 1, wherein, for a given pixel, performing the ray tracing comprises casting a single ray from a location on an object corresponding to the given pixel towards the light source to generate the ray traced shadow value for the given pixel.

5. The method according to claim 1, wherein for a subset of the set of close shadow edge pixels, the shadow value is based on blending the shadow mapped shadow value and the ray traced shadow value.

6. The method according to claim 5, wherein blending the shadow mapped shadow value and the ray traced shadow value comprises a computed a weighted average of the shadow mapped shadow value and the ray traced shadow value.

7. The method according to claim 1, wherein the threshold distance is based on a type of the light source.

8. A non-transitory computer-readable storage medium storing instructions that, when executed by one or more processors, causes a computing device to generate shadows in an image of a scene, by performing the steps of:
   generating a shadow map to determine which pixels in screen space are in shadow;

for each pixel identified as being in shadow in the shadow map, performing a sampling of neighboring pixels;

for each pixel identified as being in shadow in the shadow map, computing an average brightness of the sampling of neighboring pixels in the shadow map to generate a shadow mapped shadow value for the pixel;

determining a set of close shadow edge pixels, wherein each pixel in the set of close shadow edge pixels is an edge pixel on a border between a shadow region and a non-shadow region, and wherein each pixel in the set of close shadow edge pixels corresponds to a location on an object that is below a threshold distance to an occluding object in a direction towards a light source;

for each pixel in the set of close shadow edge pixels, performing ray tracing from the location on the object corresponding to the pixel to determine a ray traced shadow value for the pixel; and outputting shadow values for the pixels identified as being in shadow in the shadow map, wherein for pixels in the set of close shadow edge pixels, the shadow value is based on the ray traced shadow value, and wherein the shadow value is based on the shadow mapped shadow value for pixels in shadow other than the pixels in the set of close shadow edge pixels.

9. The computer-readable storage medium according to claim 8, wherein generating the shadow map comprises:
generating a depth map from a point of view of the light source;
rendering the scene from a camera viewpoint, including coordinates of objects corresponding to pixels in screen space;
for each pixel in screen space, comparing the coordinates of the object in the pixel to the depth map to determine whether the pixel is in shadow or not in shadow; and
generating the shadow map based on results of the comparing.

10. The computer-readable storage medium according to claim 8, wherein, for a given pixel, the sampling of neighboring pixels comprises selecting eight neighboring pixels of the given pixel in the shadow map, including a pixel above the given pixel, a pixel below the given pixel, a pixel to the left of the given pixel, a pixel to the right of the given pixel, and four diagonal pixels.

11. The computer-readable storage medium according to claim 8, wherein, for a given pixel, performing the ray tracing comprises casting a single ray from a location on an object corresponding to the given pixel towards the light source to generate the ray traced shadow value for the given pixel.

12. The computer-readable storage medium according to claim 8, wherein for a subset of the set of close shadow edge pixels, the shadow value is based on blending the shadow mapped shadow value and the ray traced shadow value.

13. The computer-readable storage medium according to claim 12, wherein blending the shadow mapped shadow value and the ray traced shadow value comprises a computed a weighted average of the shadow mapped shadow value and the ray traced shadow value.

14. The computer-readable storage medium according to claim 8, wherein the threshold distance is based on a type of the light source.

15. A device for generating shadows in an image of a scene, the device comprising:
a memory storing instructions; and
one or more processors configured to the execute the instructions to cause the device to:
generate a shadow map to determine which pixels in screen space are in shadow;
for each pixel identified as being in shadow in the shadow map, perform a sampling of neighboring pixels;
for each pixel identified as being in shadow in the shadow map, compute an average brightness of the sampling of neighboring pixels in the shadow map to generate a shadow mapped shadow value for the pixel;
determine a set of close shadow edge pixels, wherein each pixel in the set of close shadow edge pixels is an edge pixel on a border between a shadow region and a non-shadow region, and wherein each pixel in the set of close shadow edge pixels corresponds to a location on an object that is below a threshold distance to an occluding object in a direction towards a light source;
for each pixel in the set of close shadow edge pixels, perform ray tracing from the location on the object corresponding to the pixel to determine a ray traced shadow value for the pixel; and
output shadow values for the pixels identified as being in shadow in the shadow map, wherein for pixels in the set of close shadow edge pixels, the shadow value is based on the ray traced shadow value, and wherein the shadow value is based on the shadow mapped shadow value for pixels in shadow other than the pixels in the set of close shadow edge pixels.

16. The device according to claim 15, wherein generating the shadow map comprises:
generating a depth map from a point of view of the light source;
rendering the scene from a camera viewpoint, including coordinates of objects corresponding to pixels in screen space;
for each pixel in screen space, comparing the coordinates of the object in the pixel to the depth map to determine whether the pixel is in shadow or not in shadow; and
generating the shadow map based on results of the comparing.

17. The device according to claim 15, wherein, for a given pixel, the sampling of neighboring pixels comprises selecting eight neighboring pixels of the given pixel in the shadow map, including a pixel above the given pixel, a pixel below the given pixel, a pixel to the left of the given pixel, a pixel to the right of the given pixel, and four diagonal pixels.

18. The device according to claim 15, wherein, for a given pixel, performing the ray tracing comprises casting a single ray from a location on an object corresponding to the given pixel towards the light source to generate the ray traced shadow value for the given pixel.

19. The device according to claim 15, wherein for a subset of the set of close shadow edge pixels, the shadow value is based on blending the shadow mapped shadow value and the ray traced shadow value.

20. The device according to claim 19, wherein blending the shadow mapped shadow value and the ray traced shadow value comprises a computed a weighted average of the shadow mapped shadow value and the ray traced shadow value.

* * * * *